United States Patent
Dillersberger (10) Patent No.: US 9,479,072 B2
(45) Date of Patent: Oct. 25, 2016

(54) FLYBACK CONVERTER

(71) Applicant: Harald Dillersberger, Graz (AT)

(72) Inventor: Harald Dillersberger, Graz (AT)

(*) Notice: Subject to any disclaimer, the term of this patent is extended or adjusted under 35 U.S.C. 154(b) by 60 days.

(21) Appl. No.: 14/436,251

(22) PCT Filed: Oct. 8, 2013

(86) PCT No.: PCT/EP2013/070909
§ 371 (c)(1),
(2) Date: Apr. 16, 2015

(87) PCT Pub. No.: WO2014/060241
PCT Pub. Date: Apr. 24, 2014

(65) Prior Publication Data
US 2015/0270784 A1   Sep. 24, 2015

(30) Foreign Application Priority Data

Oct. 17, 2012  (DE) .................. 20 2012 009 919 U (51) Int. Cl.
| H02M 3/335 | (2006.01) |
| H02M 1/36 | (2007.01) |
| H02M 3/338 | (2006.01) |

(52) U.S. Cl.
CPC ........... *H02M 3/33576* (2013.01); *H02M 1/36* (2013.01); *H02M 3/3381* (2013.01); *H02M 3/33507* (2013.01)

(58) Field of Classification Search
CPC ............... H02M 3/335–3/33592; H02M 1/36
See application file for complete search history.

(56) References Cited

U.S. PATENT DOCUMENTS

| 6,775,164 B2* | 8/2004 | Wong .................... H02M 3/156 363/147 |
| 7,170,762 B2 | 1/2007 | Chian et al. |
| 2003/0146797 A1* | 8/2003 | Atsumi .................... G04F 5/14 331/94.1 |
| 2005/0041437 A1* | 2/2005 | Chian ................. H02M 3/3381 363/16 |
| 2014/0063875 A1* | 3/2014 | Al-Shyoukh ........... H02M 1/36 363/49 |

FOREIGN PATENT DOCUMENTS

| FR | 2952484 | 5/2011 |
| FR | 2952484 A1 | 5/2011 |

OTHER PUBLICATIONS

On Semicondcutor, "Design Note—DN05038/D, Non-Isolated, 8 Watt Dual Output, Off-Line Power Supply" Oct. 2012. pp. 1-10.*

(Continued)

*Primary Examiner* — Harry Behm
*Assistant Examiner* — Peter Novak
(74) *Attorney, Agent, or Firm* — Dinsmore & Shohl LLP (57) ABSTRACT

The invention relates to a flyback converter circuit comprising a transformer, a charging capacitor, a diode, a semiconductor switch and a controller, which form a flyback converter, wherein the controller is designed to control the semiconductor switch after the start of the flyback converter. The transformer has a primary winding and a secondary winding each having a winding beginning and a winding end. Furthermore, a start transistor is provided, which is coupled by its gate terminal to the winding beginning of the secondary winding of the transformer and is connected by its drain terminal to the winding end of the primary winding of the transformer, wherein an oscillator is formed at least by means of the transformer and the start transistor. Moreover, the charging capacitor supplies the controller with energy. The diode is provided between the winding beginning of the secondary winding of the transformer and the charging capacitor, wherein the anode of the diode is connected to the charging capacitor.

9 Claims, 4 Drawing Sheets

(56) References Cited

OTHER PUBLICATIONS

On Semiconductor, "NCP1070, NCP1071, NCP1072, NCP1075,NCP1076, NCP1077 High-Voltage Switcher for Low Power Offline SMPS". Apr. 2016. pp. 1-30.*

International Preliminary Report on Patentability issued in corresponding Appln. No. PCT/EP2013/070909.

Salah-Eddine Adami, et al.: "Self-Powered Ultra-low Power DC-DC Converter for RF Energy Harvesting", Jun. 1, 2012, 2012 IEEE Faible Tension Faible Consommation, pp. 1-4, XP055137006, DOI: 10.1109/FTFC.2012.6231746 ISBN: 978-1-46-730820-5.

International Search Report mailed Sep. 4, 2014 related to PCT/EP/2013/070909 filed Oct. 8, 2013.

* cited by examiner

FLYBACK CONVERTER

The invention relates to a flyback converter circuit. Generic flyback converter circuits have a transformer, a charging capacitor, a diode, a semiconductor switch and a controller. The transformer has a primary winding and a secondary winding, each having a winding beginning and a winding end. The two windings can be connected in an opposing manner. The core of the transformer has an air gap. It can also be described as a flyback transformer, dual inductor or coupled inductors. The controller is designed to control the semiconductor switch after the start of the flyback converter.

A flyback converter is also described as buck-boost converter. A flyback converter constitutes a certain form of a DC/DC converter.

A simple basic structure of a flyback converter will now be described by reference to FIG. 3.

Figure 3:
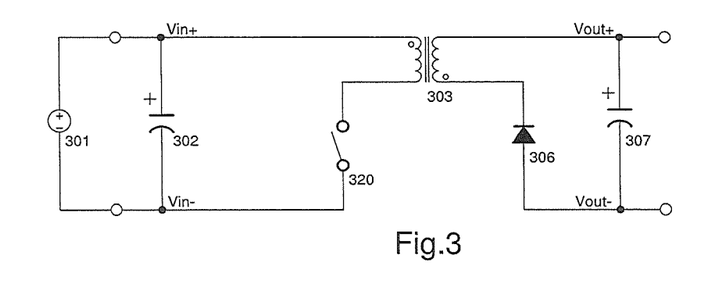
FIG. 3 shows an example for a flyback converter.

The flyback converter of FIG. 3 has a voltage source 301, a transformer 303, a diode 306, a charging capacitor 307 and a switch 320. In addition a further capacitor 302 is provided parallel to the voltage source 301, but which is not necessary for the operation of the flyback converter, wherein the two points on the transformer 303 indicate the winding direction. Where reference is made in the description to "winding beginning" and "winding end", this serves purely for easier understanding. In principle it is also possible to interchange the terminals in a transformer, provided that the interconnection of the coils of the transformer, in opposite direction or same direction, is retained.

The basic mode of operation of the flyback converter will be described below. In principle, two operating modes, the conducting phase and the non-conducting or blocking phase, alternate with each other in a flyback converter. It is determined by the switch 320 which operating mode is currently active. If the switch 320 is closed, the flyback converter is in the conducting phase. If the switch 320 is open, it is in the blocking phase.

In the conducting phase, a current flows through the primary winding of the transformer 303 due to the voltage source 301. As the diode 306 blocks a current flow through the secondary winding of the transformer 303, this secondary winding is currentless. Hereby the magnetomotive force in the air gap of the transformer 303 increases.

If the switch 320 is opened, the current flow through the primary winding or primary side of the transformer 303 ends. Due to the fact that the current flow through the primary side of the transformer 303 is stopped very quickly, the current through the secondary side of the transformer 303 increases. The current flows through the diode 306 so that the charging capacitor 307 is charged. Subsequently the switch 320 is closed again and a new cycle consisting of the conducting phase and the blocking phase is begun.

By cycling or phasing the switch 320 the power charging the capacitor 307 can be adjusted. A load at the charging capacitor 307 for example can thus be supplied with certain output voltage, or an energy storage, in particular an accumulator, can be charged with a certain current. In the configuration of a flyback converter shown here, the input and output are respectively galvanically isolated. This is indeed advantageous but is not absolutely necessary and operation without galvanic isolation can also be allowed through a corresponding additional interconnection. In the case of the flyback converter shown here, the input voltage can be both greater and also lower than the output voltage. This depends essentially upon the control of the switch 320 which is preferably configured as a semiconductor switch. Reference is made here to a buck or boost operating mode.

The flyback converter can work in discontinuous or continuous current mode. In continuous current mode the inductor is still live or current carrying when the semiconductor switch is switched on. Unlike a boost converter, it is possible to work in continuous current mode with the flyback converter with a corresponding winding ratio also in the case of a very large ratio of output voltage to input voltage with practically realisable duty cycle. With the flyback converter shown here, this is possible for example with an input voltage of 20 mV and with a duty cycle of 75% up to an output voltage of 6 V. This is calculated, with the omission of the losses present, according to the formula:

$$\frac{V_{out}}{V_{in}} = \frac{\tau_{conducting\ phase}}{\tau_{blocking\ phase}} \times N$$

whereby it is to be considered that the duty cycle is defined as follows:

$$\text{duty cycle} = \frac{\tau_{conducting\ phase}}{\tau_{conducting\ phase} + \tau_{blocking\ phase}}$$

This means that the ratio of the conducting phase to the blocking phase is 3:1. In addition, it is assumed that a 1:100 transformer is used, wherein N is the windings of the secondary side with one winding of the primary side.

The discontinuous current mode can also be referred to as intermittent flow operation. In discontinuous current mode the current flow begins through the inductance, thus the primary winding of the transformer 303, at 0 A. With omission of the losses arising and a constant input voltage it reaches a maximum current flow of $I_{max}$, which results as follows:

$$I_{max} = \frac{V_{in} \times \tau_{conducting\ phase}}{L(\text{prim})}$$

wherein $V_{in}$ is the input voltage and L(prim) is the inductance of the primary winding of the transformer.

The following thus results for the input resistance:

$$R_{in} = \frac{L(\text{prim})}{2 \times \tau_{conducting\ phase} \times f}$$

at a switching frequency f $$f < \frac{1}{\tau_{conducting\ phase} + \tau_{blocking\ phase}}$$

Accordingly the input resistance is independent of the voltage source. This facilitates in thermoelectric generators, which have a constant output resistance that is independent of the output voltage, a very simple impedance matching.

The capacitor 302 which is connected parallel to the voltage source 301 is, as previously noted, not absolutely necessary. It is used here, however, as the voltage source 301 has an output resistance of greater than zero. The output resistance of the voltage source 301 thus forms, together with the capacitor 302, a low-pass. This results in the input voltage not decreasing too greatly in the conducting phase.

The version of a flyback converter illustrated with reference to FIG. 3 constitutes a general embodiment, wherein it is assumed that the switch 320 is controlled by an external controller. Integrated flyback converter circuits also exist, in which both the semiconductor switch 320 and also the controller are provided, as this makes the overall solution smaller and more favourable. No further energy supply is required for this controller in the current flyback converter circuits.

Figure 4:
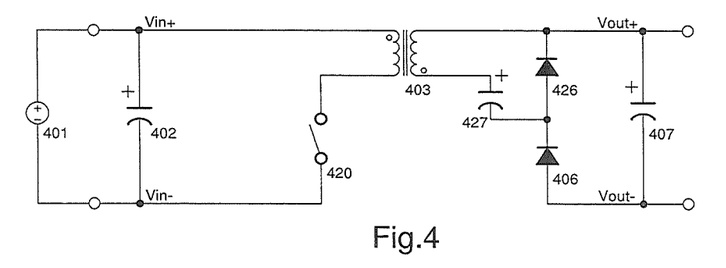
FIG. 4 shows a further example for a flyback converter.

A somewhat modified version of a flyback converter is shown in FIG. 4. In this embodiment of a flyback converter, an additional capacitor 427 and a further diode 426 are provided. Through this structure of the flyback converter, a rectification of the output voltage can be realised by means of a Greinacher circuit.

Here, in the conducting phase the capacitor 427 is charged via the diode 426 to the induced voltage of the secondary winding minus a diode voltage. The advantage with respect to the flyback converter shown in FIG. 3 is that the diode 406 here must only withstand $V_{out}$ plus a diode voltage.

In the blocking phase the charging capacitor 407 is charged via the diode 406 and the capacitor 427. The diode 426 is exposed in turn here only to $V_{out}$ plus a diode voltage. The diode 426 can for example be configured as a Schottky diode.

Power management circuits for small input voltages, such as a flyback converter, are often used in connection with energy harvesting. This means that a sufficient voltage to operate components is to be generated with energy sources that have a very low voltage and only low power. An example of such an energy source is a thermoelectric generator, which can also be described as a thermogenerator, for example an eTEG HV56 of Nextreme. This supplies, with a temperature difference of 8 K, an output voltage without load of 200 mV and has an output resistance of approximately 10Ω. Its maximum power with a 10Ω load is 1 mW. This means that in this case the output voltage is 100 mV and the output current is 10 mA. Besides the efficiency of circuits for such energy sources, in particular the impedance matching (MPPT—maximum power point tracking) is important.

Boost converter circuits that have an impedance matching are known which already start from 300 mV. As soon as they have been started they can work at an input voltage of 100 mV. At these very low input voltages, however, a very high duty cycle is used, whereby a large proportion of switching losses is present. The efficiency of such circuits is therefore low. A further disadvantage of this known circuit is that a controller is scarcely possible in the continuous current mode.

For even lower input voltages a solution is known, wherein an oscillator is realised with transformer and connected rectifier as well as voltage limiter. Such a circuit is marketed for example by Linear Technology under LTC3108. Hereby the switching frequency is dependent upon the components, and no impedance matching is possible either. In addition the input current increases linearly with the input voltage, which results in a low maximum input voltage.

Circuits are also known that use the induced voltage of a transformer to carry out energy harvesting and generate, with a charge pump, a negative voltage to disconnect a start oscillator. Such a circuit is known for example from U.S. Pat. No. 7,170,762 B2. This circuit has, depending upon the system, a poor efficiency. A continuous current mode is not possible either.

It is the object of the invention to create a flyback converter circuit which is to be cost-effectively realised and requires a low start voltage.

This object is achieved according to the invention by a flyback converter circuit having the features of claim 1.

Further advantageous embodiments are indicated in the dependent claims, the description and also in the drawings and the description thereof.

According to claim 1 a generic flyback converter circuit is expanded in that a start transistor is provided which is coupled by its gate terminal to the winding beginning of the secondary winding of the transformer. By its drain terminal it is connected to the winding end of the primary winding of the transformer. By means at least of the transformer and the start transistor an oscillator, in particular a LC oscillating circuit, is formed. Furthermore the diode is provided between the winding beginning of the secondary winding of the transformer and the charging capacitor, whereby the anode of the diode is connected to the charging capacitor and the controller is supplied with current by means of the charging capacitor. Hereby it is not necessary for the diode to be directly linked to the winding beginning of the secondary winding of the transformer. A capacitor can also be interposed, such as for example in the modified version of a flyback converter as shown in FIG. 4.

Within the scope of the invention a primary winding or primary side of a transformer can be understood to be the winding, at which the input voltage is provided, and a secondary winding or secondary side of the winding of the transformer, that at which the output voltage is generated. A flyback converter circuit according to the meaning of the invention is in particular a flyback converter with provided start circuit. "Coupled" can be understood within the scope of the invention as a direct connection as well as a connection via one or more components.

A core idea of the invention can be seen in providing an oscillator which already starts to oscillate at low voltages. With this oscillator, higher, in particular negative, voltages can then be generated in order to start the flyback converter, or to begin with its control. Subsequently the oscillator is to be switched off. The controller can be supplied with energy via the output of the circuit.

A further core idea forming the basis of the invention is not to provide a separate oscillator but instead to use components that are used for the flyback converter at least partially also for the oscillator.

The flyback converter circuit according to the invention thus allows, with respect to conventional boost converter circuits, the advantage that a smaller duty cycle and thus a better efficiency are achieved in particular with lower input voltages. This means that lower input voltages can also be used with the circuit. A continuous current mode is also possible with the circuit according to the invention even with very low input voltages.

A further advantage of the flyback converter circuit according to the invention is that both a discontinuous and a continuous current mode are possible. An impedance matching from very small to very large resistances can thus be achieved. The switching frequency can also be selected relatively independently. It is thus possible to also use smaller transformers, whereby in turn the overall costs of the circuit are lowered. In addition the input voltage can be greater than the output voltage. Furthermore in the circuit according to the invention a defined maximum coil current is possible, which simplifies the design of the circuit.

In principle, it is possible with the circuit according to the invention to link the transformer only with the primary side to the positive potential of the voltage source or also to connect a terminal of the secondary side to the positive potential of the input voltage. In dependence upon this design, it is preferable if the charging capacitor lies with its second side on the negative or positive potential of the input voltage. Within the scope of the description the positive potential of the input voltage is also described as $V_{in+}$, the negative potential of the input voltage as $V_{in-}$ and the negative potential of the output voltage as $V_{out-}$. The positive potential of the output voltage is at the second side of the charging capacitor and corresponds, depending upon the exact construction of the flyback converter circuit according to the invention, either to $V_{in+}$ or $V_{in-}$.

A second semiconductor switch can be provided to isolate the source terminal of the start transistor from $V_{in+}$. Another possibility is to switch the start transistor to a high impedance state by means of a second semiconductor switch arranged at a different location in that its gate is set to $V_{out-}$. In addition the gate of the start transistor can be connected via a resistor, for operating point adjustment, to the positive potential of the input voltage. The two variants facilitate switching off the oscillator as soon as the flyback converter has securely started up with its controller. In principle, however, other possibilities are also conceivable for stopping the oscillator.

In order to determine the time at which the oscillator can be switched off and the controller for the flyback converter can be securely started, it is preferable to provide a comparator. This can detect, for example using a reference voltage, when a sufficient voltage is available at the charging capacitor to start the controller in a secure way.

For connecting the positive potential of the voltage source, the winding beginning of the primary winding of the transformer is particularly suited.

In principle the transformer can have any winding ratio. It is advantageous if this winding ratio is 1:100. The greater N that is selected, the greater is the output voltage that can be generated with a low input voltage. However, the peak currents and peak voltages hereby generated must be considered in the design of the circuit, in particular of the components.

A depletion n-MOSFET or a native n-MOSFET or a n-JFET can be used as a start transistor. It is likewise possible to use a depletion dual gate n-MOSFET for this, whereby this then also contains the stopping transistor.

According to a preferred embodiment a control capacitor and a control diode are provided for control of the semiconductor switch by the controller. Hereby the control capacitor can be connected on one side to the controller and on the other side to the cathode of the control diode. It is further provided that the cathode of the control diode and the second side of the control capacitor are connected to the gate of the semiconductor switch. It is hereby made possible to provide a defined voltage for the semiconductor switch so that the flyback converter can be efficiently operated.

The anode of the control diode can be connected with $V_{in-}$.

The invention will be described in greater detail below by reference to exemplary embodiments and schematic drawings, in which.

Identical or similar components are designated with the same reference numerals in the drawings, whereby the first digit is different and indicates the figure. In order to avoid repetition, components having the same function are not necessarily covered in detail again.

Figure 1:
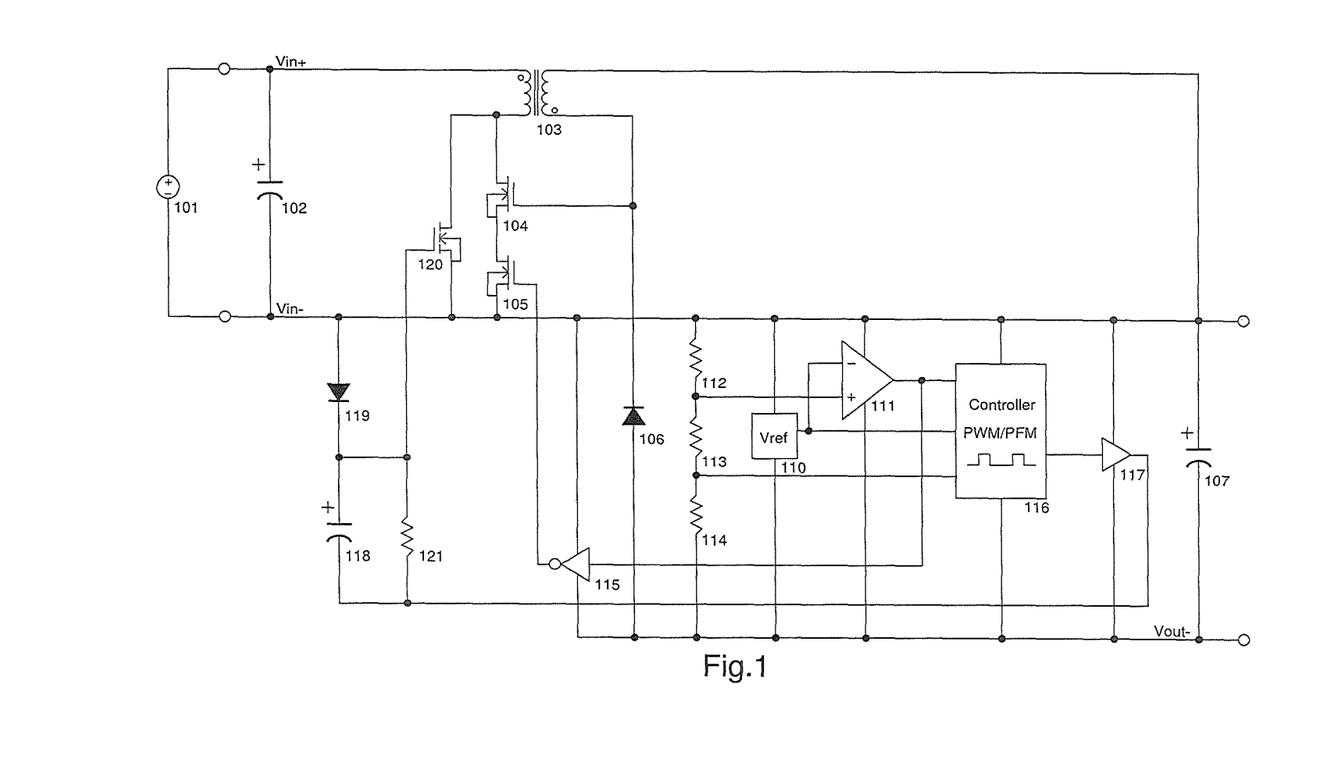
FIG. 1 shows a first embodiment of a flyback converter circuit according to the invention.

FIG. 1 shows a first embodiment of a flyback converter circuit according to the invention. The flyback converter is hereby formed by a transformer 103, a diode 106, a charging capacitor 107 and a semiconductor switch 120. The flyback converter is supplied with energy by a voltage source 101. In parallel with the voltage source 101 there is again a capacitor 102 which has the same effect as already described with reference to FIG. 3. The oscillator for starting is formed in this embodiment by the transformer 103 and the start transistor 104. The frequency (f) of the oscillator is determined corresponding to:

$$f = \frac{1}{2 \times \pi \times \sqrt{L(\sec) \times C}}$$

wherein C is the total of the input capacitance of the transistor 104 and the capacitance of the secondary side of the transformer 103 and L (sec) is the inductance of the secondary side of the transformer 103.

The transistor 104 can be formed for example as a depletion n-MOSFET or as an n-JFET. The gate-source cut-off voltage of the depletion n-MOSFET and the gate-source cut-off voltage of the n-JFET each lie below 0 V, for example being −0.5 V. Connecting to the start transistor 104 a further depletion n-MOSFET 105 is provided with a threshold voltage of for example −1.2 V in order to switch off the oscillator after the start of the controller of the flyback converter. In principle it is possible to interchange the arrangement of the two transistors 104 and 105. They can also be configured as a depletion dual gate n-MOSFET.

The mode of operation of the circuit according to the invention is described in brief below. As soon as the voltage at the voltage source 101 increases, the current in the primary winding of the transformer 103 increases and simultaneously a voltage is induced in the secondary winding of the transformer 103 which increases the gate voltage at the transistor 104. The transistor 104 thereby has a lower ohmic value and the current can increase further. Through the resistive voltage drop, the voltage at the primary winding reduces, as a result of which the voltage at the gate of the transistor 104 falls, the transistor 104 gets a higher ohmic value and this causes a further reduction in the voltage at the primary winding. This then leads to a negative gate voltage at the start transistor 104 which cuts off at its threshold voltage. The current can then only further flow, as already described with respect to the flyback converter, in the secondary side of the transformer 103. This causes the charging capacitor 107 to be charged to a low voltage. This charging takes place via the diode 106 so that the energy charged into the capacitor 107 can no longer flow away. The current in the secondary winding of the transformer 103 now goes towards zero, the gate voltage at the transistor 104 also becomes 0 V and the current in the primary winding of the transformer 103 begins to increase again. The periodic current pulses charge the charging capacitor 107 to an increasing voltage.

By means of three resistors 112, 113, 114 and a reference voltage source 110, a comparator 111 monitors the voltage at the charging capacitor 107. For example the comparator switches at 1.8 V under the assumption that the three resistors 112, 113 and 114 have each the same value, and the reference voltage source 110 supplies a reference voltage of 1.2 V.

The switchover of the comparator 111 causes the output of an inverter 115 of initially $V_{in-}$ to switch to 1.8 V below this potential. This causes the transistor 105 to switch off and the oscillator is stopped.

Through the switchover of the comparator 111, a controller 116 also becomes active. This can now, as the voltage at the charging capacitor 107 is high enough, also be supplied by means thereof. Until now a driver 117 which is provided after the controller 116 was without a signal, thus low. A control capacitor 118 is hereby already charged to 1.8 V less the diode voltage of the control diode 119. As this voltage reduction is to be kept as low as possible, the diode 119 can be configured for example as a Schottky diode. As soon as the driver 117 is switched to high, the gate of the semiconductor switch 120 is charged through this switchover process. The exact voltage depends upon the ratio of the magnitude of the capacitance of the capacitor 118 and the input capacitance of the semiconductor switch or transistor 120.

The capacitor 118 should thus be large in relation to the input capacitance of the semiconductor switch 120. It is possible for example to provide a ratio of 1 nF to 40 pF. Through the exact configuration it must be ensured that the resulting gate voltage is above the threshold voltage of the semiconductor switch 120. The semiconductor switch 120 can be configured for example as an enhancement n-MOSFET with a threshold voltage of 0.8 V.

It is likewise possible to configure the transistor 120 as an enhancement p-MOSFET insofar as the over-voltage upon switching off of the transistor 120 at the winding end of the primary winding of the transformer 103 is lower than the threshold voltage of the p-MOSFET. This corresponds to the total of the output voltage and the diode voltage divided by the winding ratio. In this case the p-MOS transistor with $V_{in+}$ is controlled in a blocking manner and with $V_{out-}$ in a conducting manner. The control capacitor 118 and the control diode 119 can then be omitted.

As soon as the driver 117 switches again to low, the voltage at the control capacitor 118 is lower than before this switching cycle, whereby the control capacitor 118 is charged again via the control diode 119. Furthermore a resistor 121 is provided parallel to the control capacitor 118. This serves to discharge the capacitor 118 as soon as the circuit is disconnected. This means that the input voltage falls to 0 V.

The resistor 121 can have a value of for example 100 MΩ. Under certain conditions this resistor can, however, also be omitted if sufficient parasitic resistors of the circuit are present, for example through the capacitor, the present diodes, the gate of the semiconductor switch 120 or the circuit board itself.

The diode 106 can in principle be a Schottky diode or have a n-MOSFET in parallel, which is controlled by the controller. The diode can also be the parasitic diode of this n-MOSFET.

The controller 116 can be configured so that it controls, by means of the frequency and the duty cycle of the converter, the voltage at the charging capacitor 107 to the desired output voltage (pulse width modulation–PWM). A pure pulse frequency modulation (PFM) or combined PWM/PFM are also possible. In the embodiment according to FIG. 1 the resistor tap between the resistors 113 and 114 is to be adjusted to the value of the reference voltage 110, and an output voltage of 3.6 V is to be reached. For this, an impedance matching can also be provided.

The circuit shown here can start from approximately 20 mV with a transformer which has a winding ratio of 1:100. The maximum input voltage is limited in the circuit according to the invention only by the maximum voltages of the diode 106 and the transistors 104, 105 and 120.

Figure 2:
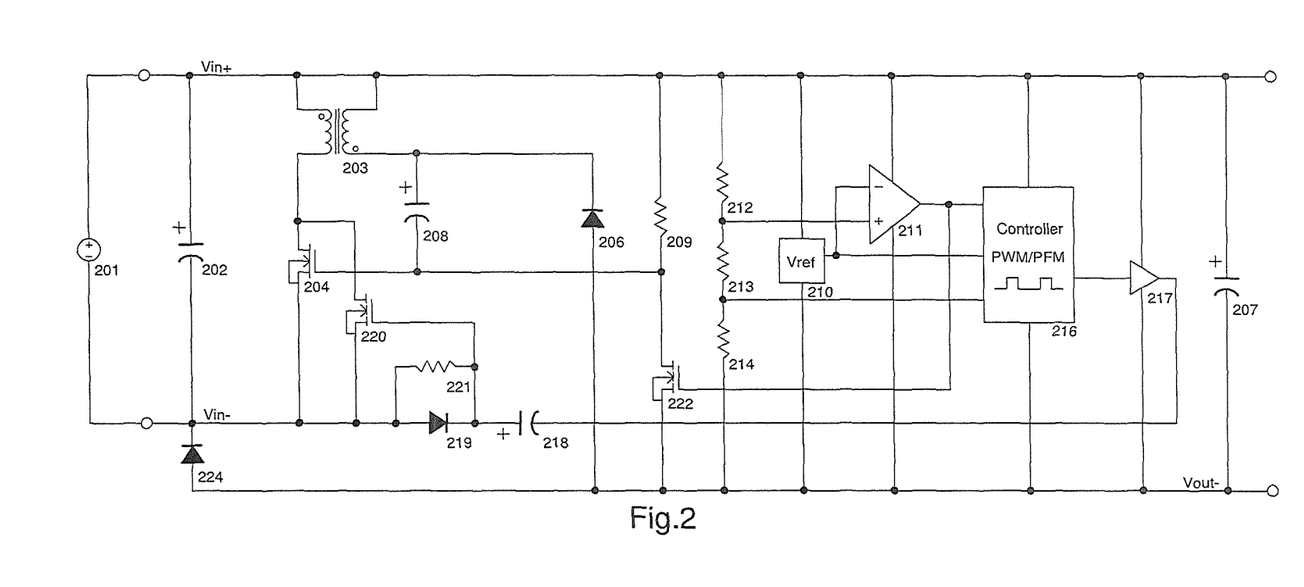
FIG. 2 shows a second embodiment of a flyback converter circuit according to the invention.

FIG. 2 shows another embodiment of the flyback converter circuit according to the invention. This constitutes a further development based on the circuit shown in FIG. 1. It has the advantage that there are lower voltages present at the transistors, whereby these can be designed more cost-effectively. In addition this embodiment shows another possibility for switching off the oscillator which can also be used in the circuit according to FIG. 1.

In this embodiment, a capacitive coupling between the winding beginning of the secondary winding of the transformer 203 and the gate terminal of the start transistor 204 is realised via a capacitor 208. With a resistor 209 the operating point of the transistor 204 is set. In addition the inverter 115 of FIG. 1 has been replaced by a transistor 222 and the resistor 209. The transistor 222 preferably has a threshold voltage that is greater than the supply voltage, from which the output of the comparator 211 is defined. This causes the transistor 222 not to switch through up to the switchover of the comparator 211. After the switchover, the gate voltage of the transistor 204 is switched to $V_{out-}$, whereby the oscillator is stopped. In the formula for the frequency of the oscillator the input capacitance of the transistor 104 must be replaced, correspondingly for the circuit according to FIG. 2, by the serial connection of the capacitor 208 with the total of the input capacitance of the transistor 204 and the output capacitance of the transistor 222. This total should be small with respect to the capacitance of the capacitor 208 in order to achieve a good coupling. The resistor 209 can have a high ohms value and be for example 10 MΩ.

In the embodiment according to FIG. 2 the start transistor 204 can be configured as a depletion MOSFET with a threshold voltage of −0.5 V, as a n-JFET with a gate-source cut-off voltage of −0.5 V or as a native MOSFET with a threshold voltage of 0 V. The resistor 209 can be connected with a first side to $V_{in+}$, $V_{in-}$ or the winding beginning of the secondary winding of the transformer 203, whereby in the case of n-JFET the connection to $V_{in-}$ and with the native MOSFET the two other possibilities are preferred.

In principle the bulk terminals of the transistors 104, 105, 120, 204 and 220 can be at $V_{in-}$ in order to eliminate the bulk effect. For this, a production process with isolated n-MOS transistors is necessary. It is also possible, however, to configure the transistor 220 again as a p-MOSFET. For this, the same requirements apply as already mentioned with reference to FIG. 1. In addition, however, it is also to be considered that when starting the controller the negative output voltage potential must be below $V_{in-}$ by more than a threshold voltage. This can lead to problems in particular with rapidly increasing input voltages.

It can be advantageous in both embodiments to provide a corresponding over-voltage protection for the gate of the transistors 104 and 204.

The operating principle of the circuit shown here corresponds to that of FIG. 1. There are, however, a few more minor differences, which will be discussed in detail below. The gate of the start transistor 204 has the positive input voltage potential at the beginning, which leads with low input voltages and good coupling by the capacitor 208 practically to the same behaviour as described in FIG. 1.

The control capacitor 218 is charged in FIG. 2 only to a value corresponding to $V_{in-}$ less the negative output voltage potential minus a diode voltage. The discharge resistor 221 is connected in parallel to the control diode 219 in this version. The control capacitor 218 can hereby be discharged. In addition there is the advantage that a smaller current can flow via the discharge resistor 221 during the start process with respect to the circuit according to FIG. 1.

Furthermore an additional diode 224 is provided. This can be realised with an integrated solution as an ESD protection diode. It is also possible to provide a Schottky diode. A further advantage is that the charging capacitor 207 in this case can be charged directly via the energy source 201, whereby the start process is accelerated. In the case of large input voltages the start process via the oscillator can also become superfluous.

In addition to the inputs of the controller 216 shown here it may be necessary to provide further inputs, for example an input for $V_{in-}$ and control variables that depend upon the currents through the diode 206 and the transistor 220 or the temperature. This can also be the case with the control according to FIG. 1.

In a deviating embodiment of the circuits according to FIG. 1 and FIG. 2 the driver 117 or 217, the control capacitor 118 or 218, the control diode 119 or 219, the transistor 120 or 220 and the discharge resistor 121 or 221 can also be split into two parts, wherein the first part has a ratio of 5:1 and the second part a smaller ratio of 1:1 between the capacitance of the control capacitor 118 or 218 and the input capacitance of the transistor 120 or 220. The first part can hereby be used from an output voltage of for example 1.8 V, the second additionally from 3 V. This leads in particular with integrated circuits, wherein the control capacitor 118 or 218 is to be integrated, to space saving.

The embodiment shown of the flyback converter circuit according to the invention can start already from 20 mV when using a transformer with a winding ratio of 1:100. A limitation of the level of the input voltage is present through the output voltage and the threshold voltage of the transistor 204, but not through the maximum voltages of the transistors.

With the present flyback converter circuit, a circuit is indicated which can be cost-effectively realised and works with low input voltages.

The invention claimed is:
1. Flyback converter circuit, having
a transformer which has a primary winding and a secondary winding, each having a winding beginning and a winding end,
a charging capacitor,
a diode,
a semiconductor switch and
a controller,
wherein a start transistor is provided which is coupled by its gate terminal to the winding beginning of the secondary winding of the transformer and is connected by its drain terminal to the winding end of the primary winding of the transformer,
wherein an oscillator is formed at least by means of the transformer and the start transistor,
the charging capacitor supplies the controller with energy and the diode is provided between the winding beginning of the secondary winding of the transformer and the charging capacitor,
wherein
the transformer, the charging capacitor, the diode, the semiconductor switch and the controller form a flyback converter,
the controller is designed to control the semiconductor switch after the start of the flyback converter, and
the anode of the diode is connected to the negative side of the charging capacitor,
wherein the positive side of the charging capacitor lies on the negative or positive potential of the input voltage,
the semiconductor switch is provided between the winding end of the primary winding of the transformer and the negative potential of the input voltage,
the source terminal of the start transistor is coupled to the negative potential of the input voltage, and
a voltage is created at the negative side of the charging capacitor which is below the negative potential of the input voltage and which is used to switch off the oscillator.

2. Flyback converter circuit according to claim 1, wherein
a second semiconductor switch is provided to isolate the source terminal of the start transistor from the negative potential of the input voltage.

3. Flyback converter circuit according to claim 1, wherein
a second semiconductor switch is provided to switch the start transistor to a high impedance state.

4. Flyback converter circuit according to claim 1, wherein
a comparator is provided to detect a sufficient voltage for the operation of the controller to control the semiconductor switch of the flyback converter.

5. Flyback converter circuit according to claim 1, wherein
the winding beginning of the primary winding of the transformer is connectable to a positive potential of the voltage source.

6. Flyback converter circuit according to claim 1, wherein
the transformer has a winding ratio of at least 1:10, preferably 1:100.

7. Flyback converter circuit according to claim 1, wherein
the start transistor is designed as a depletion n-MOSFET, as a native n-MOSFET or as a n-JFET.

8. Flyback converter circuit according to claim 1, wherein
a control capacitor and a control diode are provided for control of the semiconductor switch by the controller,
the control capacitor is coupled on one side to the controller and is connected on the other side to the cathode of the control diode,
the cathode of the control diode and the second side of the control capacitor are connected to the gate of the semiconductor switch.

9. Flyback converter circuit according to claim 8, wherein
the anode of the control diode is connected to the negative potential of the input voltage.

\* \* \* \* \*